US012225880B1

(12) United States Patent
Alsup et al.

(10) Patent No.: US 12,225,880 B1
(45) Date of Patent: Feb. 18, 2025

(54) ANIMAL FOOTBATH FLUSHING SYSTEM AND METHOD THEREOF

(71) Applicant: Specialty Sales, LLC, Fresno, CA (US)

(72) Inventors: Donald Alsup, Fresno, CA (US); Gary Oliver, Jerome, ID (US); Dustin Lessley, Tulare, CA (US)

(73) Assignee: Specialty Sales, LLC, Fresno, CA (US)

( * ) Notice: Subject to any disclaimer, the term of this patent is extended or adjusted under 35 U.S.C. 154(b) by 0 days.

(21) Appl. No.: 18/646,666

(22) Filed: Apr. 25, 2024

(51) Int. Cl.
*A01K 13/00* (2006.01)

(52) U.S. Cl.
CPC .................. *A01K 13/001* (2013.01)

(58) Field of Classification Search
CPC .............................. A01K 13/00; A01K 13/001
See application file for complete search history.

(56) References Cited

U.S. PATENT DOCUMENTS

| 853,533 | A | 5/1907 | Byrd |
|---|---|---|---|
| 983,820 | A | 2/1911 | Goff |
| 1,123,094 | A | 12/1914 | Cary |
| 1,600,306 | A | 9/1926 | Beddoes et al. |
| 1,893,482 | A | 1/1933 | Belt |
| 1,928,717 | A | 10/1933 | Campus |
| 2,667,654 | A | 2/1954 | George et al. |
| 2,810,671 | A | 10/1957 | Taylor |
| 2,956,565 | A | 12/1957 | Anderson |
| 2,870,478 | A | 1/1959 | Schuster |
| 2,897,963 | A | 8/1959 | Byers |
| 2,967,763 | A | 1/1961 | Doman |
| 2,989,379 | A | 6/1961 | Gilberton |
| 3,208,434 | A | 9/1965 | Barton |
| 3,380,080 | A | 4/1968 | Farrell |
| 4,020,796 | A | 5/1977 | Grifa |
| 4,086,669 | A | 5/1978 | Combis |
| 4,126,104 | A | 11/1978 | Overby |

(Continued)

FOREIGN PATENT DOCUMENTS

| CA | 2600324 A1 * | 3/2008 | ........... A01K 13/001 |
|---|---|---|---|
| CN | 1726898 A | 2/2006 | |

(Continued)

OTHER PUBLICATIONS

US 9,838,200 B2, 12/2017, Tomomura (withdrawn)

(Continued)

*Primary Examiner* — Ebony E Evans
(74) *Attorney, Agent, or Firm* — Sierra IP Law, PC; Mark D. Miller

(57) ABSTRACT

A comprehensive animal footbath flushing system is provided that includes a source of water under pressure, that may be selectively introduced either to a flushing outlet in the footbath, or to a venturi pipe adjacent to a drain for the footbath, or to both at the same time. Water or a water-chemical mixture may be introduced into the footbath basin to flush out any accumulated organic materials. Alternately or at the same time, a separate flow of water may be introduced into the drain line which causes a Venturi at the drain, and facilitates rapid removal of water and other materials from the footbath. The drain opening may be provided in the floor of the basin or in one of the side walls. In some embodiments the basin floor is sloped, and the drain is located at a lower end of the floor.

18 Claims, 7 Drawing Sheets

(56) References Cited

U.S. PATENT DOCUMENTS

| | | |
|---|---|---|
| 4,165,714 A | 8/1979 | Weissman |
| 4,184,488 A * | 1/1980 | Bielich ............... A61H 35/006 |
| | | 4/574.1 |
| 4,317,431 A | 3/1982 | Sparkes |
| 4,445,690 A | 5/1984 | Cairns |
| 4,446,590 A | 5/1984 | Kirchner, Jr. et al. |
| 4,485,503 A * | 12/1984 | Rolando ............... A47K 3/022 |
| | | 4/622 |
| 4,629,087 A | 12/1986 | Lenz |
| 4,899,789 A | 2/1990 | Carow |
| 5,048,463 A | 9/1991 | Wilson |
| 5,058,780 A | 10/1991 | Plester et al. |
| 5,091,343 A | 2/1992 | Schneider et al. |
| 5,118,004 A | 6/1992 | Carilli |
| 5,138,980 A | 8/1992 | Ewing |
| 5,146,785 A | 9/1992 | Riley |
| 5,203,366 A | 4/1993 | Cxeck et al. |
| 5,248,070 A | 9/1993 | Nolte et al. |
| 5,259,527 A | 10/1993 | Gates |
| 5,329,878 A | 7/1994 | McCauley |
| 5,353,957 A | 10/1994 | Campau |
| 5,381,923 A | 1/1995 | O'Dea |
| 5,467,922 A | 11/1995 | Carey |
| 5,526,841 A | 6/1996 | Detsch et al. |
| 5,630,379 A | 5/1997 | Gerk et al. |
| 5,678,591 A | 10/1997 | Merrifield et al. |
| 5,769,029 A * | 6/1998 | Marshall ............... A01K 13/001 |
| | | 119/651 |
| 5,769,109 A | 6/1998 | Stanton et al. |
| 5,774,909 A | 7/1998 | Stable |
| 5,967,202 A | 10/1999 | Mullen et al. |
| 5,975,161 A | 11/1999 | Ridgley |
| 6,003,469 A | 12/1999 | Sherwood |
| 6,079,266 A | 6/2000 | Wright |
| 6,205,953 B1 | 3/2001 | Ginn |
| 6,382,136 B1 | 5/2002 | Bragulla et al. |
| 6,505,444 B1 | 1/2003 | Johnson |
| 6,520,118 B2 | 2/2003 | Swiegers et al. |
| 6,739,286 B2 | 5/2004 | Vander Veen |
| 6,742,550 B2 | 6/2004 | Caparros |
| 6,745,704 B2 | 6/2004 | Carter et al. |
| 6,948,510 B2 | 9/2005 | King |
| 7,049,339 B2 | 5/2006 | Thomson |
| 7,421,895 B1 | 9/2008 | Caldwell |
| 7,611,393 B2 | 11/2009 | Christensen |
| D610,264 S | 2/2010 | Hess et al. |
| 7,661,393 B2 | 2/2010 | Torgerson et al. |
| 7,770,760 B2 | 8/2010 | McGuffey et al. |
| 7,798,104 B2 | 9/2010 | Rajkondawar et al. |
| 7,841,299 B2 | 11/2010 | Gerk et al. |
| RE42,247 E | 3/2011 | Veen |
| 7,980,425 B2 | 7/2011 | Baron et al. |
| RE42,608 E | 8/2011 | Vander Veen |
| 8,095,997 B2 | 1/2012 | Harris |
| 8,172,079 B2 | 5/2012 | Greenberg et al. |
| 8,276,545 B2 | 10/2012 | Greeson |
| 8,347,821 B2 | 1/2013 | Murphy |
| 8,830,068 B2 | 9/2014 | Campbell |
| 8,925,493 B2 * | 1/2015 | Torgerson ............... A61K 33/26 |
| | | 119/673 |
| 9,010,277 B2 | 4/2015 | Eakin |
| 9,149,020 B1 | 10/2015 | Murphy |
| 9,743,636 B1 | 8/2017 | Casebolt |
| 9,958,308 B2 | 5/2018 | Murphy |
| 10,743,513 B2 | 8/2020 | Hillforth et al. |
| 11,122,767 B2 | 9/2021 | DeWaard |
| 11,259,499 B2 | 3/2022 | Petersen |
| 11,554,001 B1 * | 1/2023 | Alsup ............... A01K 13/00 |
| 2003/0150397 A1 | 8/2003 | Veen |
| 2004/0175433 A1 | 9/2004 | Thomson |
| 2004/0216892 A1 | 11/2004 | Giroux et al. |
| 2005/0183673 A1 | 8/2005 | McRobert |
| 2007/0074672 A1 | 4/2007 | Torgerson et al. |
| 2008/0072840 A1 | 3/2008 | Rajkondawar |
| 2008/0105581 A1 | 5/2008 | Kondo et al. |
| 2008/0121189 A1 | 5/2008 | Greeson |
| 2008/0178817 A1 | 7/2008 | Brewer |
| 2008/0196674 A1 | 8/2008 | Buck et al. |
| 2008/0216762 A1 | 9/2008 | Gerk et al. |
| 2009/0027995 A1 | 1/2009 | Bachman et al. |
| 2009/0107414 A1 | 4/2009 | Vecchia |
| 2009/0178626 A1 | 7/2009 | Greeson |
| 2009/0223128 A1 | 9/2009 | Kuschak |
| 2009/0283053 A1 | 11/2009 | Torgerson |
| 2011/0000439 A1 * | 1/2011 | Rajkondawar ....... A01K 13/001 |
| | | 119/673 |
| 2011/0100869 A1 | 5/2011 | Spann et al. |
| 2012/0015043 A1 | 1/2012 | Heacox |
| 2012/0037084 A1 | 2/2012 | Thomsen et al. |
| 2012/0090550 A1 | 4/2012 | Schlicher |
| 2012/0174872 A1 * | 7/2012 | Richards ............... A01K 13/003 |
| | | 119/665 |
| 2012/0198778 A1 * | 8/2012 | MacLean ............... E04F 17/00 |
| | | 52/302.1 |
| 2013/0098307 A1 | 4/2013 | Offhaus |
| 2013/0098816 A1 | 4/2013 | Elfstrom |
| 2013/0291297 A1 | 11/2013 | Kitamura et al. |
| 2014/0060450 A1 | 3/2014 | Kronebusch et al. |
| 2017/0135313 A1 | 5/2017 | Greeson |
| 2018/0160649 A1 | 6/2018 | Hicks |
| 2019/0045744 A1 * | 2/2019 | Petersen ............... A01K 13/001 |
| 2019/0254797 A1 | 8/2019 | Gordon |
| 2023/0084938 A1 * | 3/2023 | Flores Melendrez ....................... |
| | | A47L 7/0004 |
| | | 119/673 |

FOREIGN PATENT DOCUMENTS

| | | |
|---|---|---|
| CN | 202419891 U | 9/2012 |
| CN | 112715406 A * | 4/2021 |
| EP | 1099373 A1 | 5/2001 |
| EP | 1238581 A2 | 11/2002 |
| EP | 1238581 A3 | 11/2002 |
| EP | 2163155 | 3/2010 |
| FR | 2609361 A1 | 7/1988 |
| FR | 2841142 A1 | 12/2003 |
| GB | 1222078 A | 2/1971 |
| GB | 1506434 A | 4/1978 |
| GB | 1551144 A | 8/1979 |
| GB | 1595893 A | 8/1981 |
| GB | 2119622 | 11/1983 |
| GB | 2311202 A | 9/1997 |
| JP | 2005162290 | 6/2005 |
| NL | 1009895 C1 | 2/2000 |
| NL | 1038562 | 8/2012 |
| WO | 1993001763 | 4/1993 |
| WO | 2004033761 A | 4/2004 |
| WO | 2007058481 | 5/2007 |
| WO | 2010069328 A1 | 6/2010 |
| WO | 2012024324 | 2/2012 |
| WO | 2016071640 | 5/2016 |
| WO | 2016128684 | 8/2016 |

OTHER PUBLICATIONS

Drum Management System For Storage and Dispensing, Gator Drum Management System, Modules combine efficient drum storage, positive spill control, and safe liquid dispensing; Justrite Manufacturing Company, Mar. 14, 2006.

Environmental Products, Spill Containment Caddy For Drum Handling and Dispensing, Gator Spill Containment Caddy; Justrite Manufacturing Company, Mar. 14, 2006.

1 Photo—Specialty Sales, LLC system—Bakersfield, California Feb. 2, 2007.

2 Photos—Specialty Sales, LLC system—Tulare, California Apr. 2007.

2 Photos—Eakin Enterprises, Inc. system—Boardman, Oregon 2005.

15 Photos—Eakin Enterprises, Inc. system—Tulare, California Dates Unknown.

(56) References Cited

OTHER PUBLICATIONS

Ceemee, Preventing Lameness & Hoof Rot—Hoof Haven Foot Bath, Hoof Haven Foot Bath, Oct. 29, 2021, <https://ceemee.co.nz/product/hoof-haven-foot-bath/>, NZ.
Fjeldass, et al, Water footbath, automatic flushing, and disinfection to improve the health of bovine feet, American Dairy Science Association, 2014.
Glendale Engineering, Bespoke Cattle Crushers, Cattle Footbath, Oct. 29, 2021, <https://www.glendaleengineering.co.uk/>, Northhumberland, UK.
Nick Bell, Foot Bath Design and Construction, Jul. 2014, <https://www.cattle-lameness.org.uk/wp-content/uploads/2014/07/Foot%20bath%20design%20and%20construction.pdf >, UK.
Specialty Sales, Stainless Bath, Oct. 1, 2021, Fresno, United States.
E-mail from Alex Eakin and referended photo, dated Oct. 13, 2005 <EAK010173-EAK010174.pdf> (2 pages).
E-mail from Kelly D. Ledgerwood and referenced 'word drawing,' dated Oct. 22, 2004 <EAK010176-EAK010178.pdf> (3 pages).
Den Hartog Industries Inc. "6 Gal. Specialty Tank" drawing, dated Jul. 26, 2001 <EAK010179.pdf> (1 page).
Controls for containment: work with containment/pumping specialist BakerCorp highlights growing capabilities of Controls Inc. (Industry News); Diesel Progress North American Edition; Diesel & Gas Turbine Publications, Inc.; Nov. 1, 2008.
Don't allow lameness to grind down beef profits.; Farmers Weekly; Reed Business Information Limited Nov. 17, 2006.
HEALTH: Role of footbaths in battle to control digital dermatitis; Dairy Farmer; CMP Information Ltd, Nov. 16, 2005.
A double wall "day tank" system that provides primary and secondary containment in one integral space-saving unit is offered by Assmann Corp., Dairy Foods; Gale Group Inc, Feb. 1, 2023.
FSI International Announces $11 Million Order For Chemical Management Systems; 06:48; PR Newswire, Sep. 27, 1996.
Oxygenated feedwater treatment proves worth In a departure from traditional chemical-treatment practice, OT methodology features maintenance . . . , Power Magazine; McGraw-Hill, Inc., Oct. 1, 1994.
Compact multi-function pump controllers.(plant and equipment)(Pump Engineering Co.) (Brief article); Food Trade Review; Gale Group Inc., Feb. 1, 2007.
Chapter 35—Chemical Feed Systems, Handbook of Industrial Water Treatment; GE Power & Water Jul. 25, 2008.
Submittal Manual: Day Tank-TRS Series; Tramont Corporation Jul. 2, 2007.
Engineered Feed Systems CARUSMATIC, Selection and Application Guide, (Series 2000), Rev 5.00; Carus Chemical Company, Dec. 4, 2004.
Chemical Feed Systems, Bulletin FDP/CFS-04; Neptune Chemical Pump Co. Inc. Nov. 13, 2006.
Float Control Boxes, Price List; Kisco Sales, Inc. Nov. 15, 1996.
Pharmaceutical Process Validation: An International Third Edition, Revised and Expanded, Drugs And The Pharmaceutical Sciences vol. 125 (Ra Nash, Ah Wachter, eds.); Marcel Dekker, Inc., Dec. 31, 2003.
Recommended Standards for Water Works, 2007 Edition, Policies for the Review and Approval of Plans and Specifications for Public Water Supplies, Great Lakes—Upper Mississippi River Board of State and Provincial Public Health and Environmental Managers; Health Research, Inc., Sep. 22, 2008.
Chemical Safety Control Strategy for Critical Chemical Feed Systems, Section 6.1.3, Water, Wastewater, & Wetlands, Regulations & Standards; Massachusetts Department of Environmental Protection, Dec. 1, 2009.
Code of Practice on Technical Aspects of Fluoridation of Water Supplies; Dec. 31, 2004.
Texas Flouridation Project, Operator Manual on Flouridation Procedures. Fluoridation Procedures; Texas Department of Health, Feb. 28, 2007.
Stacked Discharge Drain Hose & Vent Hose Assemblies (347747 & 347748); SnyderIndustries, Inc. Aug. 19, 2002.
Bulk Bins, Storage and savings in bulk, Nylex Rotomould; Aug. 22, 2006.
Buyer's Guide: Intermediate Bulk Containers and Bins; Snyder Industries, Inc Mar. 8, 2007.
Nylex Bulkibox, Supertanks; RJ Cox Engineering Dec. 31, 2009.
Milk, How Products Are Made, vol. 4,. Advameg, Inc.; Advameg, Inc. May 17, 2012.
Day Tank Definition, Hu Mimi; May 17, 2012.
Assmann Polyethylene Tanks Brochure; Assmann Corporation of America Oct. 28, 2005.
Force Flow Site Map; Force Flow Chemical Monitoring Systems May 17, 2012.
Our PIG Poly Containment Units, The Big Pigalog, 2012 Buying Guide; New Pig Corporation May 18, 2012.
Justrite Master Catalog 2003-2004, Safety and Storage Solutions; Justrite Manufacturing Company Oct. 3, 2003.
PIG Poly IBC Containment Unit, Matthews An Authorized New Pig Distributor, Catalog; Matthews Austalasia Lid., Apr. 7, 2005.
IBS Containment & Dispensing Station, Little Giant, (online archive); Brennan Equipment and Manufacturing Company, Dec. 16, 2004.
Little Giant Catalog, Industrial Floor Trucks And Carts, Brennan Equipment and Manufacturing Company, 2004; Brennan Equipment and Manufacturing Company, Jun. 10, 2004.
Poly IBC Containment Unit (p. 367), The Big Pigalog, 2005 Buying Guide; New Pig Corporation Dec. 31, 2005.
Containment Unit for IBC tanks (p. 377), The Big Pigalog, 2007 Buying Guide; New Pig Corporation, Dec. 31, 2007.
Containment Unit for IBC tanks (p. 69), Pig Facility Saver, Sep. 2002; New Pig Corporation, Sep. 30, 2002.
Containment Unit for IBC tanks (p. 237), New Pig: Pig Leak and Spill Products, Jan. 1998; New Pig Corporation, Jan. 31, 1998.
Double duty Caddy & Outdoor model (28663ecp); Justrite Manufacturing Company, Sep. 29, 2010.
Dispensing Shelf & Open-view Sump (28667ecp); Justrite Manufacturing Company, Sep. 28, 2010.
The Use of Potassium Permanganate in Fish Ponds, Andrew M. Lazur (Document FA23); Institute of Food and Agricultural Sciences, University of Florida, May 22, 2012.
Texas Fluoridation Project, Flourosilic AcidSystem, 100 Gallon Bulk, Open Top Tank Containment Pressurized Injection Type; Texas Department of State Health Services, Feb. 19, 2007.
Equipment Specification, Fluorosilicic Acid System, ES-1, Revision 13; Texas Department of State Health Services, Oct. 18, 2005.
Texas Fluoridation Project, Typical Liquid Feed System, Carboy Storage; Texas Department of State Health Services, Feb. 19, 2007.
Texas Fluoridation Project, Typical Liquid Feed System, Bulk Storage; Texas Department of State Health Services, Feb. 19, 2007.
Fluoridation System Technical Requirements, Fluorosilic Acid System, TR-1, Revision 1; Texas Department of State Health Services, May 9, 2005.

\* cited by examiner

SECTION C-C

ANIMAL FOOTBATH FLUSHING SYSTEM AND METHOD THEREOF

FIELD OF THE INVENTION

The present invention relates generally to footbath systems for hoofed animals, and more particularly to a water flushing system for a hoof bath that includes a specialized flushing system designed to introduce, circulate, and dispose of fluids within the footbath, thereby ensuring maintenance of elevated hygiene standards.

BACKGROUND OF THE INVENTION

Dairy farms and cattle ranches use footbaths for treating and disinfecting the hooves or claws of livestock and cattle. A footbath may be positioned before or after a milking parlor and between walls or fencing to prevent livestock from walking around the footbath. A footbath typically includes a fluid basin having elongated side walls and shorter end walls. An entry end wall is typically provided for entering the bath and an exit end wall is provided for exiting the bath. A good footbath should be long enough such that livestock cannot jump over the bath, and wide enough that an animal cannot straddle the bath or walk through the bath with one foot out of the bath; it should be easy to fill, drain and clean. Some footbaths are wide enough to allow for two animals to enter the bath simultaneously and are more suited for large herds. In many applications, a series of footbathing stations may be provided with a first footbath acting as a pre-washing station, an island after a pre-wash, and then a plurality of treatment baths.

A footbath chemical treatment solution may include chemicals and materials to protect the hooves of animals from decay and disease, such as without limitation antimicrobial salts, copper sulfate, copper acetate, copper formate, copper, bromate, copper trichloroacetate, zinc sulfate, zinc acetate, zinc formate, zinc bromate, iron sulfate, iron acetate, iron formate, iron bromate, formalin, and various antibiotics. A footbath may be recessed into the ground, so that livestock may step down into the footbath and may step out of the footbath. A footbath may be raised above the ground requiring cattle to step over the entry end wall into the footbath. Ramps may be used in the footbaths to prevent excess splashing and sloshing of the chemical solution when the livestock enters and exits the footbath, and to provide an efficient structure that forces the claws to spread and scrape, thereby distributing a treatment solution uniformly to the hooves. Ramps may also route residual bathing solutions back into the footbath after exiting.

Conventional footbath designs typically comprise a simple basin filled with a water-chemical mixture, through which cattle walk to receive treatment for their hooves. While these systems serve the basic purpose of applying therapeutic solutions to the hooves, they present several shortcomings that limit their effectiveness and operational efficiency. Traditional footbaths lack an integrated drainage system, making it difficult to remove used and contaminated solution from the bath. This absence necessitates manual emptying and cleaning of the footbath, which is labor-intensive and time-consuming. Moreover, without efficient drainage, the chemical solution can quickly become fouled with organic matter, reducing its therapeutic effectiveness and potentially leading to the spread of pathogens among the herd. Without proper drainage and cleaning mechanisms, there is a high risk of cross-contamination between animals. As more cattle pass through the bath, the accumulation of debris and pathogens increases, potentially leading to the spread of infections rather than their prevention or treatment.

The inability to easily replace the treatment solution in footbaths without drains means that the chemical mixtures must be discarded and replenished more frequently to maintain effectiveness. This practice leads to increased chemical usage and waste, contributing to higher operational costs and environmental concerns. The static nature of footbaths without drains often results in uneven distribution of the chemical treatment over time, as the solution becomes diluted or concentrated in different areas of the bath. This inconsistency can lead to ineffective treatment of hoof diseases, with some animals not receiving the full therapeutic benefits. Given these limitations, there is a clear need for an improved footbath system that addresses the issues of drainage, contamination control, chemical efficiency, and consistent treatment delivery.

SUMMARY OF THE INVENTION

The present invention provides an animal footbath system that is operable to facilitate the containment of fluids, the application of treatment solutions, and the subsequent removal of fouled water, thereby ensuring optimal hygiene and care for animal hooves. Central to the invention is the footbath basin, which may include a bottom surface, parallel elongated side walls, and parallel end walls designated as the inlet wall and the exit wall. These components are constructed to form a watertight enclosure, either as a single piece or through watertight engagement of multiple pieces. A key feature of the basin is its drainage capability, enabled by a strategically positioned drain that is in communication with a venturi pipe system. This system is designed to efficiently remove fluid from the basin by leveraging the venturi effect, which enhances the fluid removal process through a high-velocity fluid stream.

The invention further incorporates an innovative chemical treatment system that includes at least one injection manifold and splash guard located at the top edge of the inlet wall. This system is connected to a water source, capable of delivering water or a water-chemical mixture into the basin. A valve 159 may be provided in some embodiments to direct water from a source of pressurized water to either an input 150*a* at one end of the footbath to flush out the footbath, to a pipe 150*b* leading from the drain of the footbath to cause a suction through the drain using a venturi effect, or to both the input 150*a* and drain 150*b* to simultaneously flush and quickly drain the footbath. The design ensures even distribution and prevents the mixture from splashing out when animals enter the footbath. Additionally, the footbath may include ramp(s) at the entrance and/or exit wall(s) to assist animals in entering and exiting safely and comfortably.

One aspect of the invention is a comprehensive flushing system, designed for cleaning and maintenance efficiency. This system includes a pressurizing pump connected to a water source, a check valve to prevent backflow, a water storage tank for pressurized water, and a series of valves and pipes that work together to flush out the footbath effectively. The system is equipped to provide water alone, and/or introduce disinfecting or cleaning compounds into the water flow. Water or a water-chemical mixture may be introduced into the footbath basin to flush out any accumulated organic materials. Alternately or at the same time, a separate flow of water may be introduced into the drain line which causes a Venturi at the drain, and facilitates rapid removal of water and other materials from the footbath. The fluid input may be provided at one end of the footbath, and the drain may be provided at the opposite end of the footbath. The drain opening may be provided in the floor of the basin, in an end wall, or in one of the side walls. If the basin floor is sloped, the drain is preferably located at a lower end of the floor.

In one aspect, an animal footbath apparatus is provided that comprises a basin having a bottom surface, a pair of parallel elongated side walls, and a pair of parallel end walls; a fluid inlet at a first end of the basin, and a fluid drain at an opposite end of the basin, wherein said drain is in fluid communication with a drain pipe having an angled section that extends above a top of said footbath; a source of water under pressure in fluid communication with a first pipe attached to said fluid inlet, and in fluid communication with a second pipe attached to said drain pipe adjacent to said drain; and a valve 159 attached between said source of water under pressure and said first and second pipes for controlling the flow of water to one of (i) said first pipe 150*a*, (ii) said second pipe 150*b*, and (iii) both said first pipe and said second pipe.

On related aspects, the fluid input may comprise at least one spray nozzle or a plurality of nozzles, which may or may not be attached to a manifold. In some aspects, the fluid drain may be located in the bottom surface of the basin. In some aspects the bottom surface may be sloped downward from the first end of the basin to the opposite end of the basin. In some aspects, the fluid drain may be located in one of the side walls or in an end wall opposite from the fluid inlet. In some aspects, a cleat may be provided extending across the bottom surface of the basin from one side wall to the other side wall, and the drain may be located in the bottom surface adjacent to the cleat. In some aspects a first ramp may be provided on the bottom surface adjacent to one of the end walls, and/or a second ramp may be provided on the bottom surface adjacent to the other end wall.

In some aspects, a method for flushing an animal footbath may be provided comprising the steps of filling an animal footbath with fluid, wherein the footbath comprises a basin having a bottom surface, a pair of parallel elongated side walls, a pair of parallel end walls, and a drain at one end thereof, said drain leading to an exit pipe; and introducing fluid under pressure into a pipe attached to said exit pipe adjacent to said drain to create a venturi effect at said drain to suction said fluid out of said basin. In related aspects, In related aspects, the exit pipe may extend upward at an angle such that the exit pipe extends above a level of fluid in said footbath. In other aspects, the drain may be located in the bottom surface of the basin, in one of the side walls and/or in the end wall. In some embodiments, multiple drains may be provided, in one or more of the basin floor, an end wall, one of the side walls, and combinations thereof.

In some aspects, a method for flushing an animal footbath may be provided comprising the steps of introducing fluid under pressure into at least one nozzle located at a first end of an animal footbath, wherein the footbath comprises a basin having a bottom surface, a pair of parallel elongated side walls, a pair of parallel end walls, and a drain at one end thereof, said drain leading to an exit pipe; and introducing fluid under pressure into a pipe attached to said exit pipe adjacent to said drain to create a venturi effect at said drain to suction said fluid out of said basin. In related aspects, the exit pipe may extend upward at an angle such that the exit pipe extends above a level of fluid in said footbath. In other aspects, the drain may be located in the bottom surface of the basin, in one of the side walls and/or in the end wall. In some embodiments, multiple drains may be provided, in one or more of the basin floor, an end wall, one of the side walls, and combinations thereof.

Further aspects and embodiments will be apparent to those having skill in the art from the description and disclosure provided herein.

The footbaths of the present invention may be manufactured from plastic or metal that is resistant to chemicals used in foot treatments. For example and without limitation such chemical treatments may include antimicrobial salts, copper sulfate, copper acetate, copper formate, copper, bromate, copper trichloroacetate, zinc sulfate, zinc acetate, zinc formate, zinc bromate, iron sulfate, iron acetate, iron formate, iron bromate, formalin, organic acids, inorganic acids and various antibiotics.

In some embodiments, one or more inlets and outlets may be provided in the footbath basin. In some embodiments, a lower drain may be provided in a flat portion of the basin floor surface adjacent to the cleat. Such a drain may comprise one or more openings in an area extending across the basin floor at an end wall, at a low area of the floor, or in front of a cleat. In some embodiments, one or more drains may be provided in the sidewalls or an end wall of the basin, just above the floor. In some embodiments, one or more inlet ports may be provided in an opposite end wall, allowing for fluids such as chemicals and/or water to be introduced at one end of the footbath and drain at the other end. In some embodiments, one or more inlet ports may be provided in one or both of the side walls, allowing for fluids such as chemicals and/or water to be introduced into the footbath.

In one aspect, fluid under pressure may be introduced into a single nozzle or a plurality of nozzles located at a first end of the footbath. A drain may be provided at an opposite end of the footbath, either in the floor, in the end wall or in a side wall. In these aspects, the floor of the footbath basin may be sloped down from the first end of the footbath to the opposite end. Water introduced through the nozzle(s) flows from the first end of the footbath to the drain at the opposite end. Increased fluid flow, particularly if multiple nozzles are used, may efficiently flush water, organic materials and/or contaminants from the footbath.

In a related aspect, a drain may be provided at an end of the footbath, either in the floor, in the end wall or in a side wall. An exit pipe may be attached to the drain to receive outflow. This pipe may have an angle that extends above an upper edge of the footbath. A separate pipe may be attached to the exit pipe that leads to a source of fluid under pressure. A volume of water may be introduced into the footbath to fill it. Once the footbath is full, fluid under pressure may be introduced into the separate line attached to the footbath exit pipe, causing a venturi effect that quickly drains the contents of the footbath to clean it out.

In further aspects, one or more nozzles may be located at a first end of the footbath, and a drain may be provided at an opposite end of the footbath, either in the floor, in the end wall or in a side wall. An exit pipe may be attached to the drain to receive outflow having an angle that extends above an upper edge of the footbath. A separate pipe may be attached to the exit pipe that leads to a source of fluid under pressure. Fluid under pressure may then be simultaneously introduced to both the nozzles and to the separate pipe, causing fluid and any materials in the footbath to be flushed, and causing a suction at the drain from the venturi effect.

It is therefore an object of the present invention to provide methods and apparatus for efficiently filling, flushing and draining an animal footbath.

It is also an object of the present invention to provide methods and apparatus for efficiently removing the contents of an animal footbath using a drain connected to a source of fluid under pressure that causes a venturi effect to suction fluid through the drain.

It is also an object of the present invention to provide methods and apparatus for simultaneously flushing and draining an animal footbath by introducing fluid under pressure at one end of the footbath and removing the contents of the footbath through a drain at the opposite end of the footbath, where the drain is also connected to fluid under pressure causing a venturi effect to suction the contents of the footbath out through the drain.

It is an object of the present invention to provide, a highly efficient, reliable, and user-friendly animal footbath system, offering significant advancements in the care and maintenance of animal hooves. Its design and functionality address current challenges by providing a more effective treatment and cleaning process, ultimately contributing to better animal health and hygiene.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
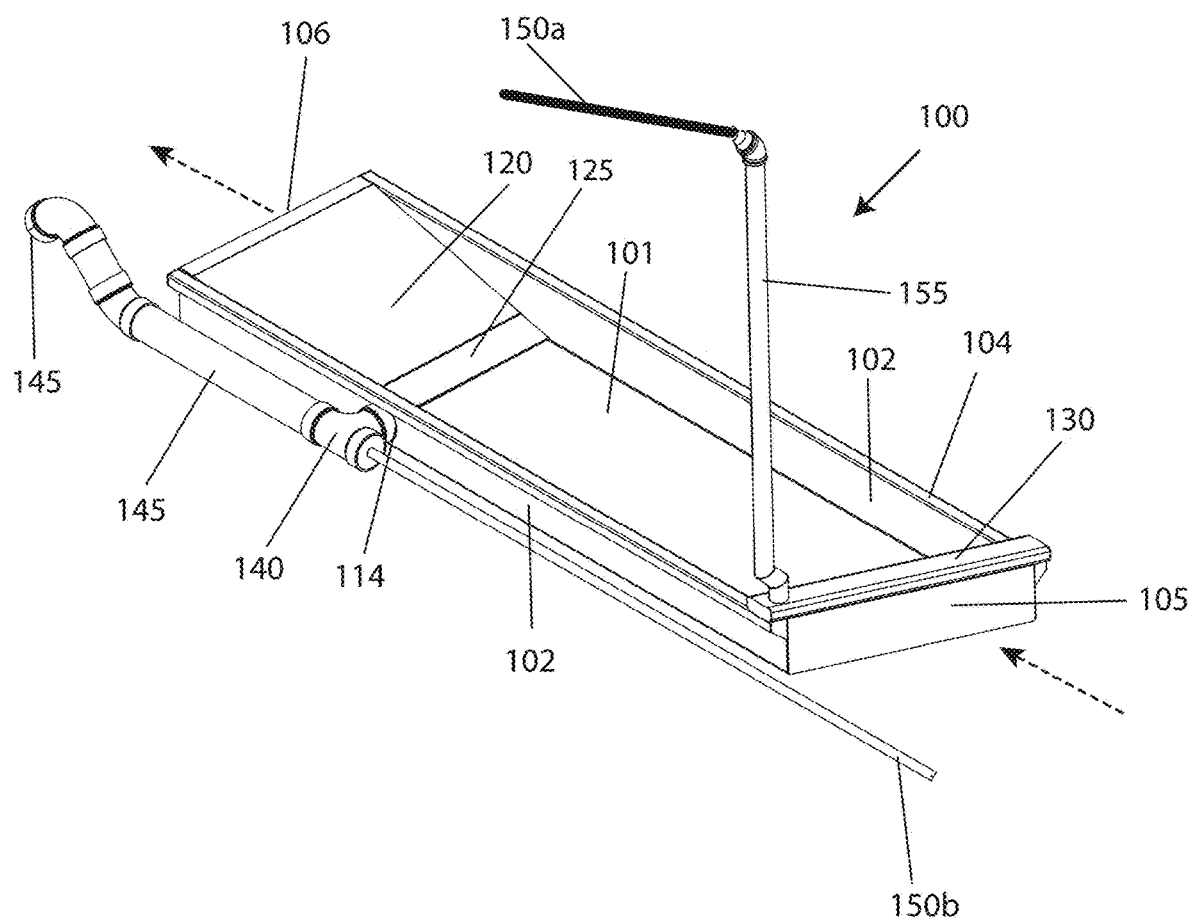
FIG. 1 is a perspective view of an embodiment of a footbath and drainage system according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-5, it is seen that the present invention includes various embodiments of an animal footbath operable to contain fluids and treat an animal's hooves with a chemical treatment solution. The illustrated embodiments include a chemical treatment system and a drain in communication with a drainage flushing system that is operable to remove fouled water from the footbath.

Without limiting the invention, FIG. 1 illustrates an exemplary footbath 100 including a water basin comprising a bottom surface 101, a pair of parallel elongated side walls 102, a pair of parallel end walls including a first end wall 105 hereinafter referred to as "inlet wall" and a second end wall 106 hereinafter referred to as "exit wall." The basin may be manufactured as a single piece or may be constructed of several pieces with watertight engagement. The elongated side walls 102 and parallel end walls 105 and 106 may have an orientation that is substantially perpendicular to the bottom surface 101, with a water-tight seal along the edges where they meet the bottom surface 101. Similarly, the junctions (corners) of the side walls 102 and end walls 105 have a water-tight seal. The walls 102, 105, and 106 may have a top edge 104.

Figure 4A:
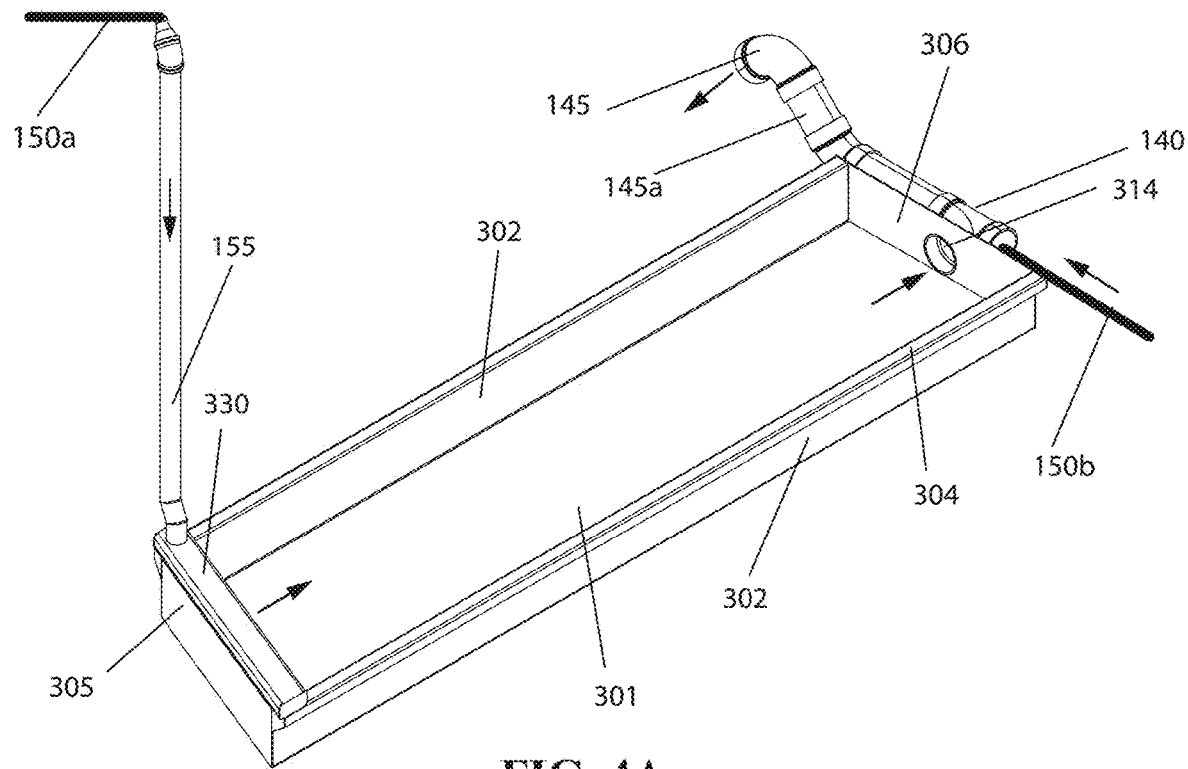
FIG. 4A is a perspective view of a footbath and drainage system according to an embodiment of the present invention.
Figure 4B:
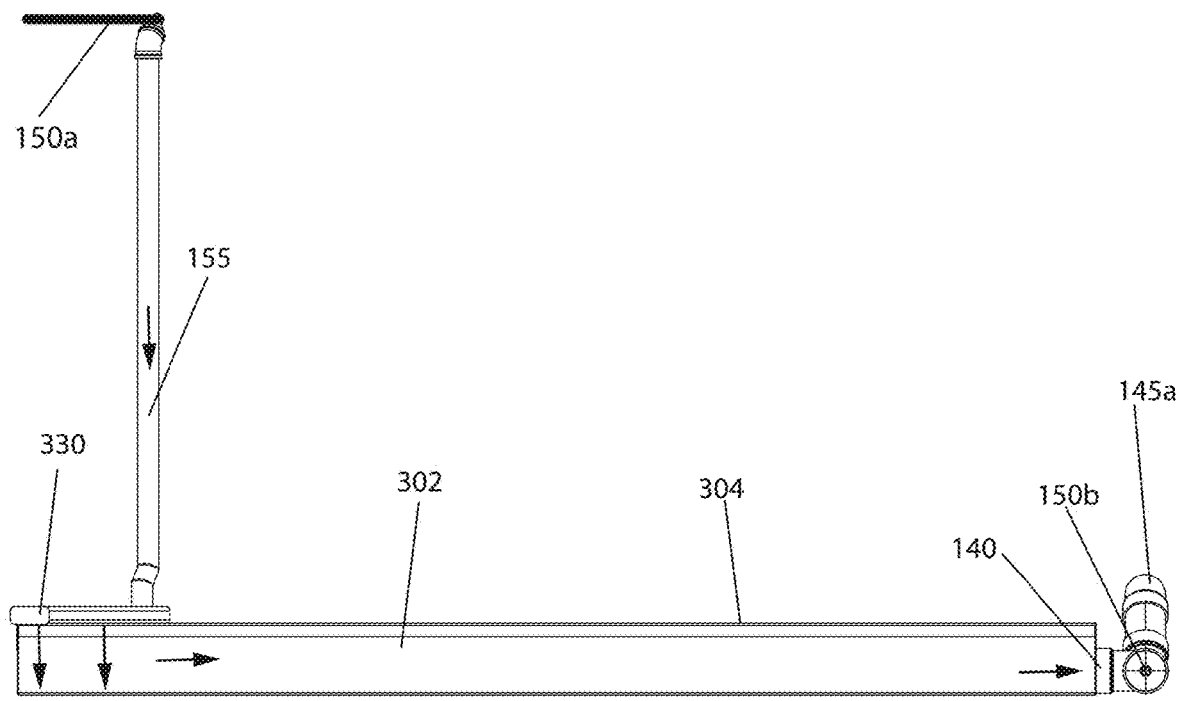
FIG. 4B is a side view of an embodiment of a footbath and drainage system according to an embodiment of the present invention.
Figure 5A:
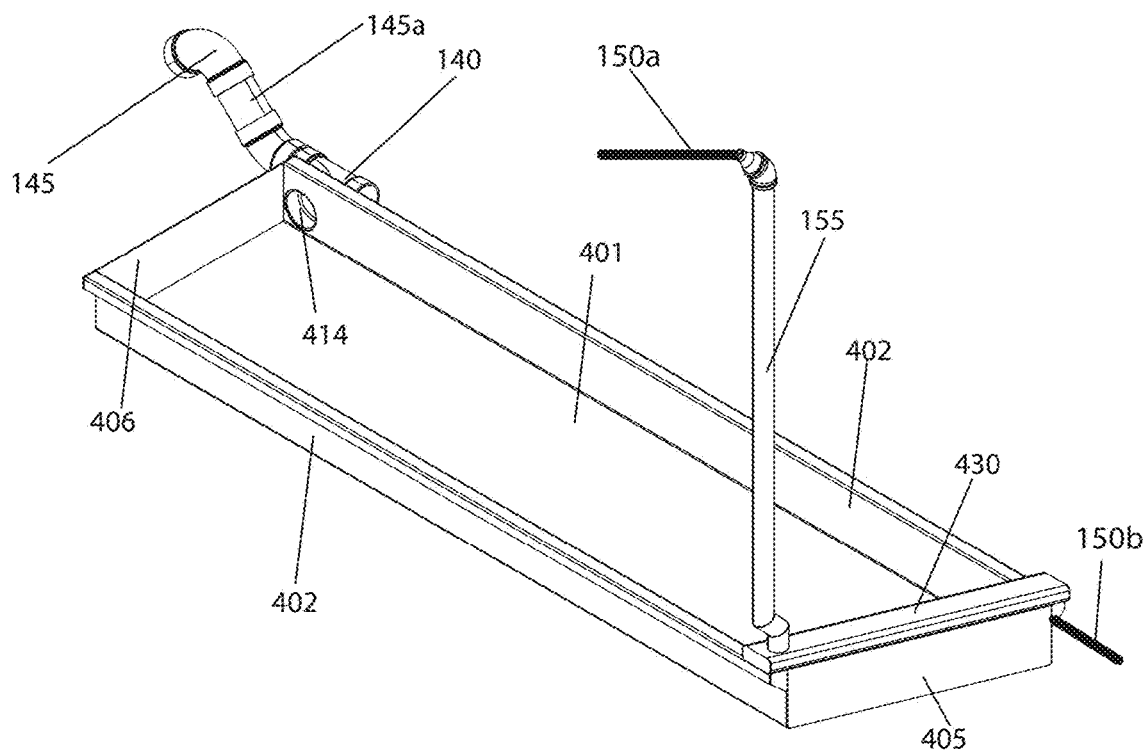
FIG. 5A is a perspective view of a footbath and drainage system according to an embodiment of the present invention.

As shown in FIGS. 1 and 5A, a drain opening 114, 414 may be positioned along one of the elongated side walls 102, 402 near the exit wall 106, 406. In some embodiments, the exit wall 106 itself may have a drain opening 414, as shown in FIG. 4A. In other embodiments, such as those shown in FIGS. 6A and 6B, drain opening 214 may be positioned in the floor 201 of the footbath, at or near the exit wall 206. It is to be appreciated that the drain 114, 214, 314, 414 may be positioned at any location downstream from the inflow of water injected into the foot bath, and may be on either of the elongated side walls 102, the exit wall 106, and may be positioned on the bottom surface 101. The drain 114, 214, 314, 414 may be in communication with venturi pipe 140, which is in communication with conduit 150b, which provides water from an upstream source to the venturi pipe 140. The venturi pipe 140 may provide a high-velocity fluid stream that is operable to pull water through the drain 114, 214, 314, 414 and send it to an angled connector pipe 145a leading to a wastewater drain 145. In some embodiments, a portion of connector pipe 145a, 145 may extend above the level of fluid in the footbath to avoid undesired draining when the flushing systems of the present invention are not in use. See side views of FIGS. 2A, 4B, 5B and 6B.

Figure 2:
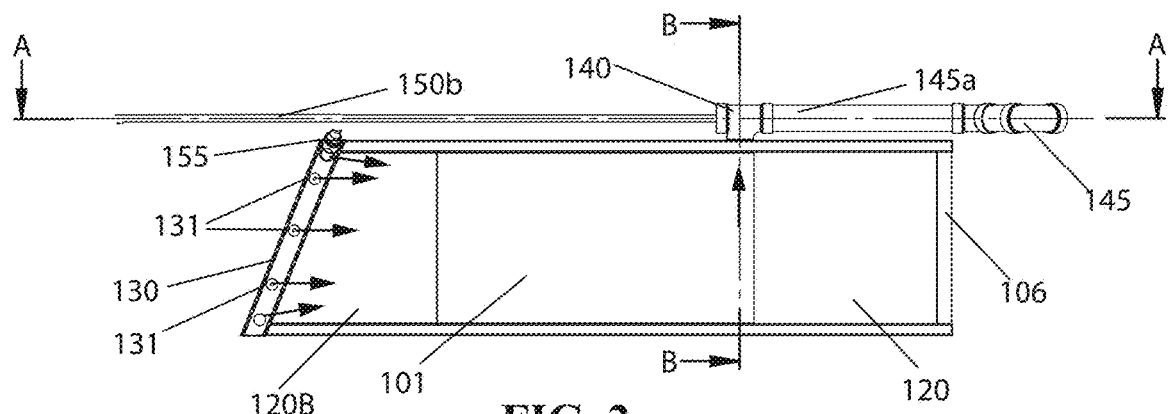
FIG. 2 is a top view of a footbath and drainage system according to an embodiment of the present invention.

Embodiments of footbath 100 may include at least one water injection port 130 at or near inlet wall 105. The injection port 130 may comprise a single opening or may be provided in the form of a manifold and splash guard as illustrated in FIGS. 1 and 2. The injection manifold and splash guard 130 may be in communication with a water conduit 155 that is further in communication with a water source 151. The water source 151 may be water or a water-chemical mixture, and the splash guard 130 may be operable to prevent the water or water-chemical mixture from splashing out of the footbath 100 when an animal enters into the water basin. Further, in some embodiments, a ramp 120 may be positioned against the exit wall 106 to assist animals in exiting the footbath 100, as shown in FIG. 1. In some embodiments a cleat 125 may be provided adjacent to ramp 120. In some embodiments, a second ramp 120B may be provided at the opposite end of the basin floor 101, as shown in FIG. 2 As illustrated in the cross-sectional view of FIG. 3B, in some embodiments the injection manifold and splash guard 130, may include a plurality of nozzles 131 that are operable to inject the water chemical mixture into the water basin of the foot bath 100. The water or chemical mixture coming through conduit 155 into opening or manifold 130 may be used to fill and/or flush the foot bath and may travel to the drain 114, 214, 314, 414.

In the embodiment shown in FIG. 2, water or a water-chemical mixture is introduced into the footbath system 100 at the inlet wall 105, where a single opening or an injection manifold and splash guard 130 are strategically positioned. Upon activation, fluid flows from the water source 151 through the conduit 155 and is injected into the footbath basin via a single nozzle, or using one or more nozzles (not explicitly shown in FIG. 2 but detailed in FIG. 3B) located within the manifold 130. The multiple nozzle embodiments ensure an even introduction and distribution of fluid at one end of the basin, facilitating fluid movement across and through the footbath.

Figure 2A:
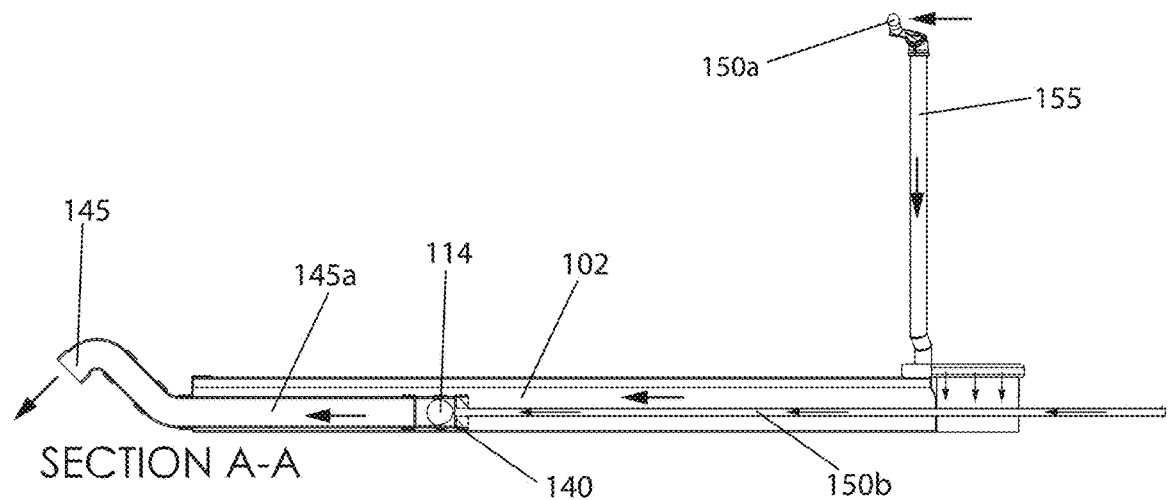
FIG. 2A is a cross-sectional side view of the footbath of FIG. 2 along line A-A.
Figure 2B:
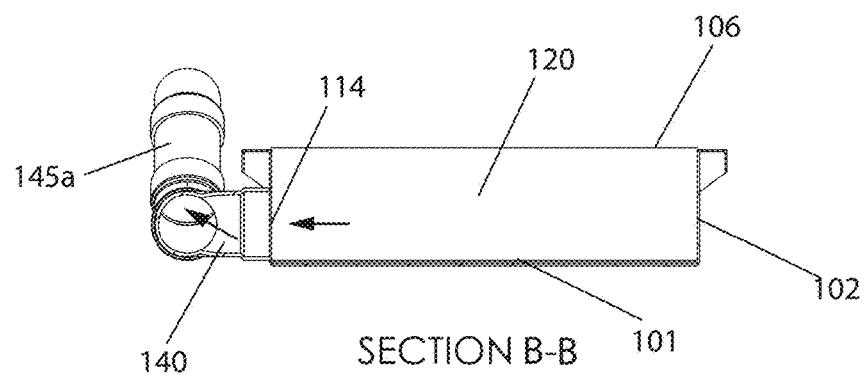
FIG. 2B is a close up cross-sectional side view of the footbath of FIG. 2 along line B-B showing an angle of an embodiment of a ramp.

As the fluid fills the footbath basin, its flow is directed by the structural design of the basin, which includes a bottom surface 101, elongated side walls 102, and an exit wall 106. The design of the basin facilitates the movement of fluid towards the exit area, where the drain 114, 214, 314, 414 is located. For example and without limitation, the basin floor 101 may have a slight downhill slope from the inlet wall 105 to the exit wall 106. In FIG. 2A, the drain 114 is shown along the elongated side wall near the exit wall 106, illustrating the fluid's path towards this drainage point. The drain 114 connects to a venturi pipe 140 (best shown in FIG. 2B). When pressurized water is introduced into pipe 140 through conduit 150b, it draws water out of the basin through drain 114 using the venturi effect to enhance water removal efficiency. The fluid then moves through a connector pipe 145a into a wastewater drain 145, facilitating the disposal or treatment of the used fluid.

In some embodiments, water or a water-chemical mixture may be introduced from valve 159 through conduit 150a through conduit 155 and into outlet/manifold 130 simultaneously with introduction of pressurized water from valve 159 through conduit 150b to pipe 140, such that there is simultaneous flushing of fluid and organic material through the footbath basin along with suction/removal thereof through the drain 114, 214, 314, 414 from the venturi effect. In other embodiments, by adjusting valve 159 the flushing through conduit pipe 150a may occur separately from or be alternated with suction caused by pressurized water passing through conduit 150b to pipe 140. In these embodiments, flushing through conduit pipe 150a may be used to fill the footbath basin, after which this is shut off at valve 159, and valve 159 is then adjusted to introduce pressurized water into conduit 150b through pipe 140, causing a venturi to suction/remove the fluid in the basin through drain 114, 214, 314, 414.

Figure 3A:
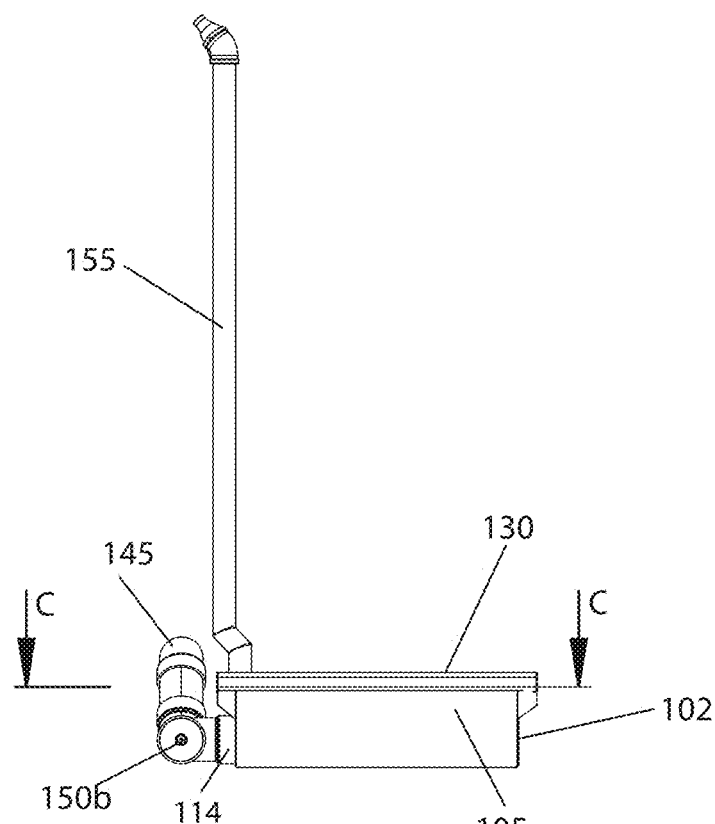
FIG. 3A is a side view of a footbath and drainage system according to an embodiment of the present invention.
Figure 3B:
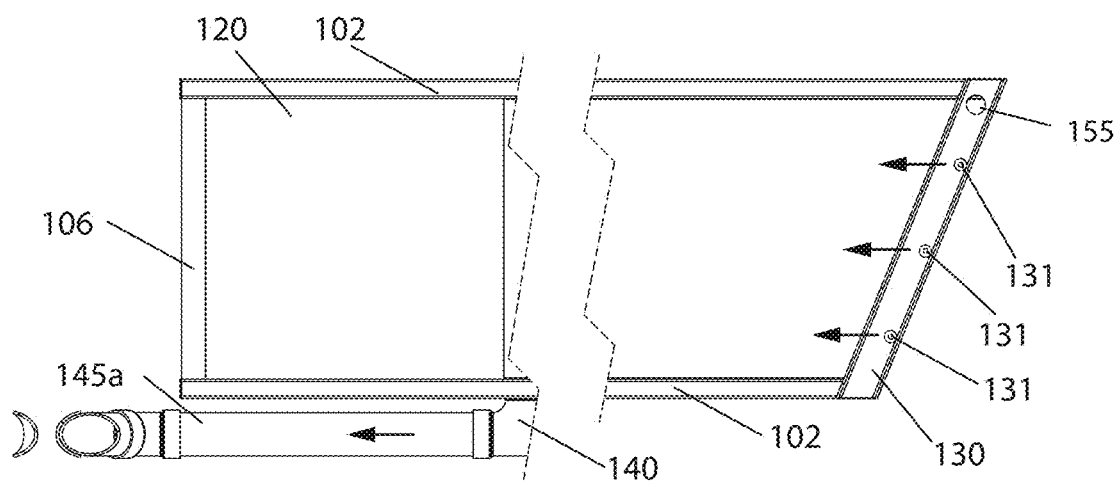
FIG. 3B is a cross-sectional cropped top view of the footbath of FIG. 3A along line C-C.

The side view of FIG. 3A provides a closeup view of an embodiment of an injection manifold and splash guard 30 located on the inlet wall 105. The manifold's connection to the water source 151 via conduit 155 and its role in dispersing the water-chemical mixture into the basin and elucidates the method by which fluids are introduced into the footbath, underscoring the system's capability to manage fluid entry efficiently. Providing a cross-sectional view, FIG. 3B further details the injection manifold and splash guard 130 mechanism, providing a clear view of the nozzles 131 which are operable to inject the water or water-chemical mixture into the basin.

FIG. 4A and FIG. 4B illustrate an embodiment of a footbath 300 that incorporates a drainage system along the exit wall 306. This embodiment includes a bottom surface 301, two parallel side walls 302, an inlet wall 305 equipped with a splash guard and injection manifold 330. In some embodiments, inlet wall 305 may include a single fluid input or nozzleb130. In some embodiments floor 301 may be sloped down from inlet wall 305 to exit wall 306, improving the flow of fluid from wall 305 to wall 306. In some embodiments, drain opening 314 may be located in exit wall 306 just above the floor 301. The system integrates the venturi pipe 140 with the drain 314 and wastewater drain 145a, highlighting an efficient mechanism for removing used water and other materials from the basin. The connection of the venturi pipe 140 to the drain 314 demonstrates the utilization of the venturi effect, creating a suction force that enhances the drainage process. This alternative setup provides an improved method for introducing cleaning chemicals or optimizing the cleaning and flushing process, through an efficient drainage design that minimizes water stagnation and maximizes cleaning efficacy.

Figure 5B:
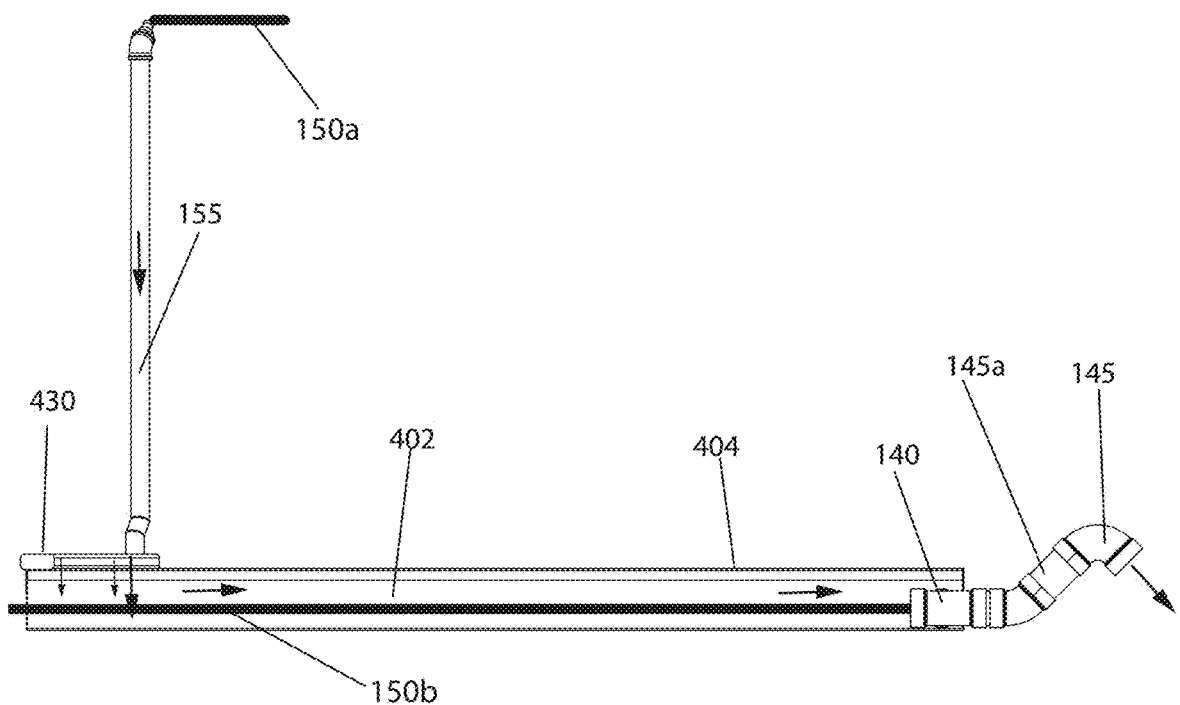
FIG. 5B is a side view of an embodiment of a footbath and drainage system according to an embodiment of the present invention.
Figure 6A:
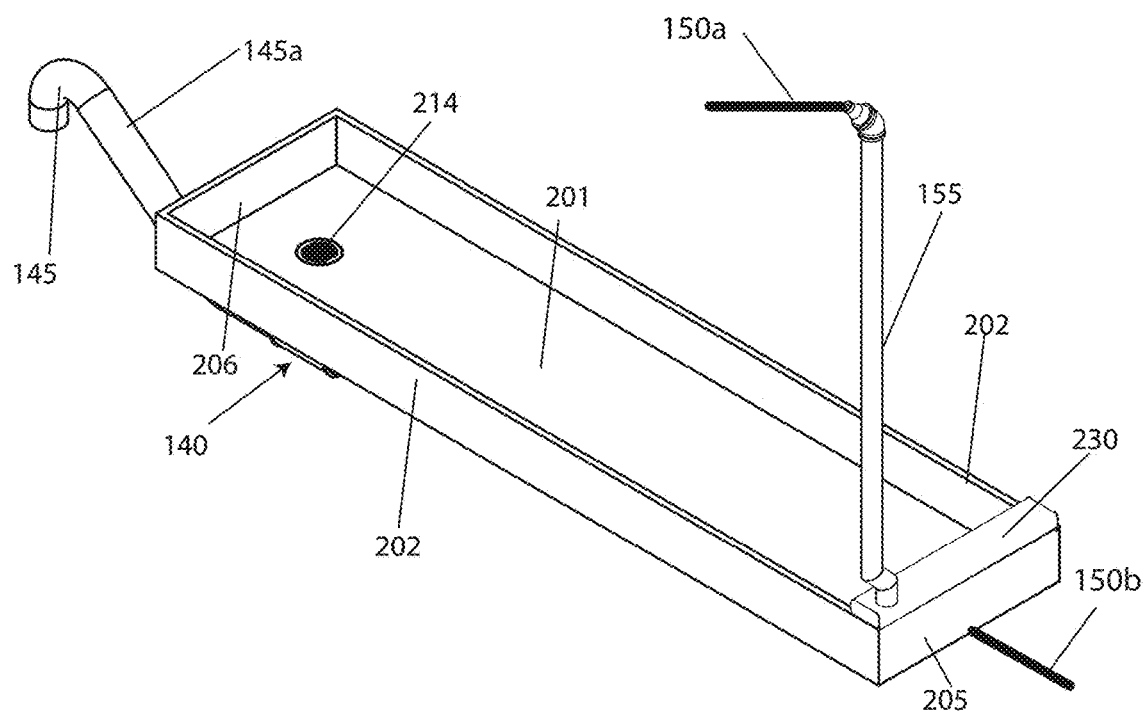
FIG. 6A is a perspective view of an embodiment of the invention having a drain in the floor of the footbath basin.
Figure 6B:
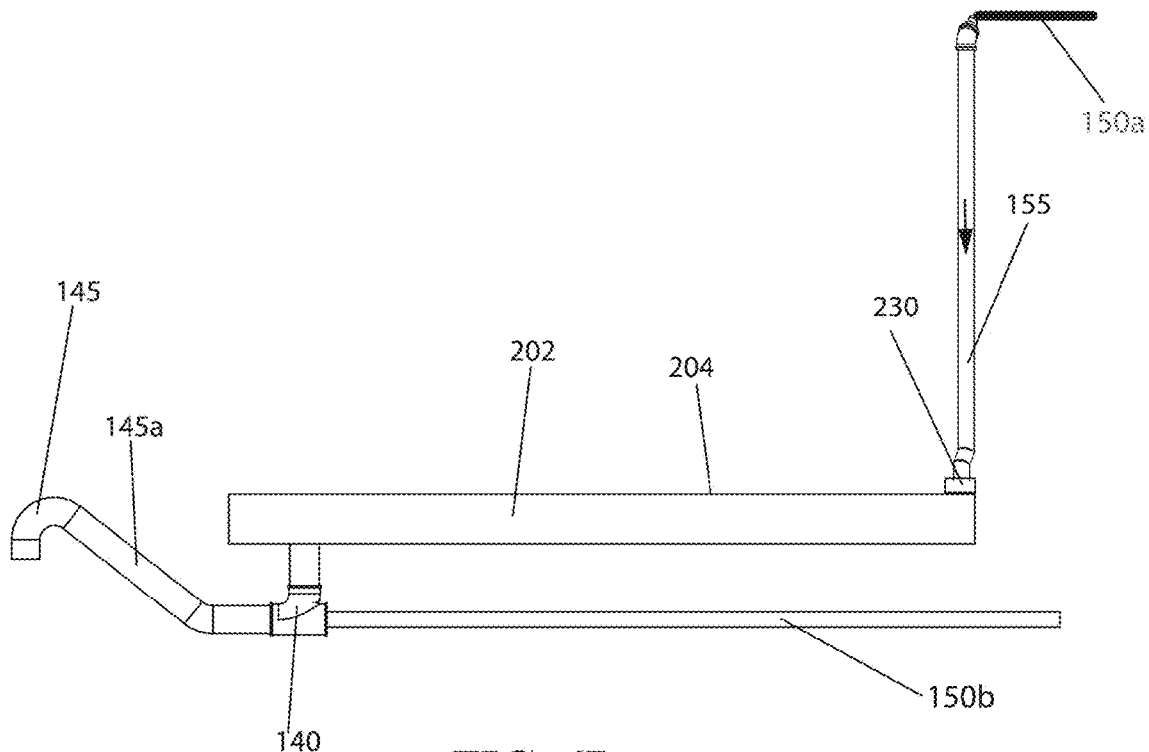
FIG. 6B is a side view of the embodiment of FIG. 6A.
Figure 7:
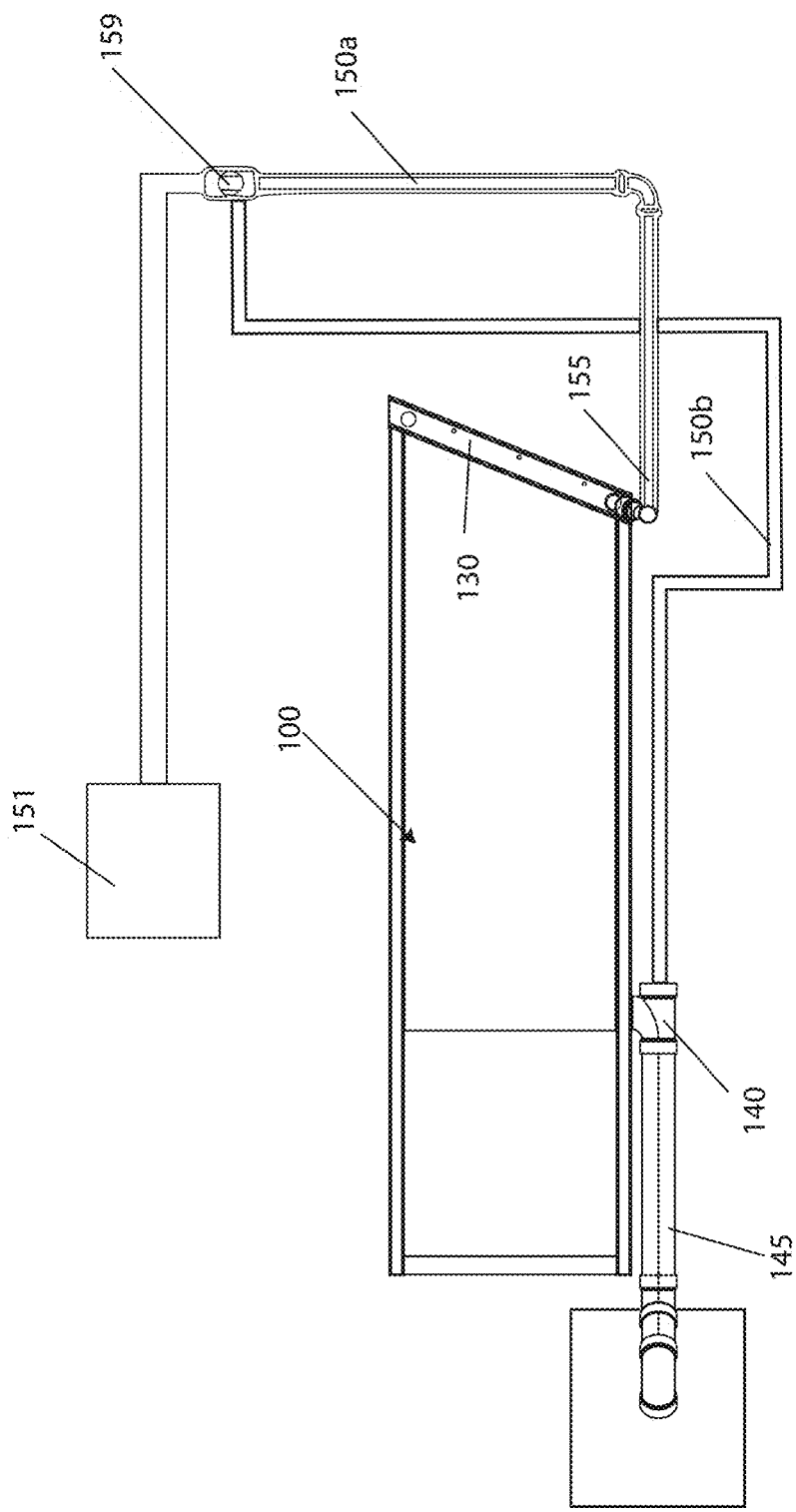
FIG. 7 is a schematic drawing of an embodiment of the invention.

In some embodiments, as illustrated in FIGS. 5A and 5B, the footbath 400 may include a drain 414 positioned along one of the side walls 402 of the footbath. Additionally, the footbath 400 may include a bottom surface 401, two parallel side walls 402, an inlet wall 405 with a splash guard and injection manifold 430. In some embodiments, inlet wall 405 may include a single fluid input or nozzle 130. In some embodiments floor 401 may be sloped down from inlet wall 405 to exit wall 406, improving the flow of fluid from wall 405 to wall 406. In some embodiments, drain opening 414 may be located in a side wall 402 just above the floor 401. In some embodiments, drain opening 414 may be located in side wall 402 at a corner where side wall 402 meets end wall 406. The footbath 400 may integrate the venturi pipe 140 with the drain 414 and the wastewater drain 145a. This setup promotes the efficient removal of used water from the basin. The venturi pipe 140, connected to the drain 414, utilizes the venturi effect to create a suction force that enhances the drainage process.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An animal footbath apparatus, comprising:
   a. a basin having a bottom surface, a pair of parallel elongated side walls, and a pair of parallel end walls;
   b. a fluid inlet at a first end of the basin, and a fluid drain at an opposite end of the basin, wherein said drain is in fluid communication with a drain pipe, said drain pipe having a first section adjacent to said drain and a second angled section downstream from the first section that extends above a top of said footbath;
   c. a source of water under pressure upstream from said drain in fluid communication with a valve, said valve being in fluid communication with a first downstream pipe attached between said valve and said fluid inlet, and said valve also being in fluid communication with a second downstream pipe, wherein said second pipe is attached directly between said valve and the first section of said drain pipe,
   wherein said valve is operable to control the flow of water to one of (i) said first pipe, (ii) said second pipe, and (iii) both said first pipe and said second pipe.

2. The apparatus of claim 1 wherein the fluid inlet comprises at least one spray nozzle.

3. The apparatus of claim 1 wherein the fluid inlet comprises a plurality of spray nozzles attached to a manifold.

4. The apparatus of claim 1 wherein the fluid drain is located in the bottom surface of the basin.

5. The apparatus of claim 4 wherein the bottom surface is sloped downward from the first end of the basin to the opposite end of the basin.

6. The apparatus of claim 1 wherein the fluid drain is located in one of the side walls.

7. The apparatus of claim 1 wherein the fluid drain is located in an end wall opposite from the fluid inlet.

8. The apparatus of claim 1 further comprising a cleat extending across the bottom surface of the basin from one side wall to the other side wall, and wherein the drain is located in the bottom surface adjacent to the cleat.

9. The apparatus of claim 1 wherein a first ramp is provided on said bottom surface adjacent to a first of said end walls.

10. The apparatus of claim 9 wherein a second ramp is provided on said bottom surface adjacent to a second of said end walls.

11. A method for flushing an animal footbath comprising the steps of:
    a. filling an animal footbath with fluid, wherein the footbath comprises a basin having a bottom surface, a pair of parallel elongated side walls, a pair of parallel end walls, and a drain at one end thereof, said drain leading to an exit pipe, said exit pipe having a first section adjacent to said drain and a second angled section downstream from the first section that extends above a top of said footbath; and
    b. introducing fluid under pressure through a pipe attached to the first section of said exit pipe to create a venturi effect in said first section to suction said fluid out of said basin through said first and second sections of said exit pipe.

12. The method of claim 11 wherein the drain is located in the bottom surface of the basin.

13. The method of claim 11 wherein the drain is located in one of the side walls.

14. The method of claim 11 wherein the drain is located in an end wall of the basin of the basin.

15. A method for flushing an animal footbath comprising the steps of:
    a. introducing fluid under pressure into at least one nozzle located at a first end of an animal footbath, wherein the footbath comprises a basin having a bottom surface, a pair of parallel elongated side walls, a pair of parallel end walls, and a drain at one end thereof, said drain leading to an exit pipe, said exit pipe having a first section adjacent to said drain and a second angled section downstream from the first section that extends above a top of said footbath; and
    b. introducing fluid under pressure through a pipe attached to the first section of said exit pipe to create a venturi effect in said first section to suction said fluid out of said basin through said first and second sections of said exit pipe.

16. The method of claim 15 wherein the drain is located in the bottom surface of the basin.

17. The method of claim 15 wherein the drain is located in one of the side walls.

18. The method of claim 15 wherein the drain is located in an end wall of the basin opposite from said first end.

* * * * *